(12) United States Patent
Bonnarang et al.

(10) Patent No.: US 8,696,252 B2
(45) Date of Patent: Apr. 15, 2014

(54) ROTARY CUTTING TOOL HAVING AN ADJUSTABLE COOLING MECHANISM

(75) Inventors: Frederic Bonnarang, Guyancourt (FR); Christian Guerardelle, Guyancourt (FR)

(73) Assignee: Iscar, Ltd., Tefen (IL)

( * ) Notice: Subject to any disclaimer, the term of this patent is extended or adjusted under 35 U.S.C. 154(b) by 461 days.

(21) Appl. No.: 13/033,333

(22) Filed: Feb. 23, 2011

(65) Prior Publication Data

US 2011/0217131 A1 Sep. 8, 2011

(30) Foreign Application Priority Data

Mar. 2, 2010 (IL) .......................................... 204235

(51) Int. Cl.
B23C 5/28 (2006.01)
(52) U.S. Cl.
USPC .............................................. 407/11; 408/57
(58) Field of Classification Search
USPC ........... 407/11; 408/56, 57, 59; 409/135, 136; 279/20; 184/6.14
See application file for complete search history.

(56) References Cited

U.S. PATENT DOCUMENTS

| | | | | |
|---|---|---|---|---|
| 4,610,579 A | * | 9/1986 | Frank et al. | 408/60 |
| 5,542,793 A | * | 8/1996 | Deiss et al. | 407/35 |
| 7,125,207 B2 | * | 10/2006 | Craig et al. | 409/136 |

FOREIGN PATENT DOCUMENTS

| | | | | |
|---|---|---|---|---|
| DE | 102004055377 A1 | | 5/2006 | |
| EP | 340026 A2 | * | 11/1989 | B23Q 11/10 |
| WO | WO 2007085281 A1 | * | 8/2007 | |

OTHER PUBLICATIONS

International Search Report dated Jun. 1, 2011 issued in corresponding International Application No. PCT/IL2011/000151.

* cited by examiner

Primary Examiner — Daniel Howell
Assistant Examiner — Brendan Ayer
(74) Attorney, Agent, or Firm — Womble Carlyle

(57) ABSTRACT

A milling cutter, having an adjustable cooling mechanism, has a tool body having a body central bore. At least one flute is formed on a body peripheral face. Each flute comprises a first row of insert pockets and at least a second row of insert pockets axially rearwardly displaced from the first row. The cooling mechanism includes a center pin having at least two grooves axially spaced apart from one another along the length of the center pin. A relocatable seal is seated in one of the grooves. When the relocatable seal is seated in a first groove, the body central bore is in fluid communication with cooling holes associated with a first number of rows of inserts; when the relocatable seal is seated in a second groove, the body central bore is in fluid communication with cooling holes associated with a second number of rows of inserts.

16 Claims, 4 Drawing Sheets

ROTARY CUTTING TOOL HAVING AN ADJUSTABLE COOLING MECHANISM

FIELD OF THE INVENTION

This invention relates to a rotary cutting tool, such as an extended flute milling cutter. More particularly, this invention relates to such cutting tools having internal cooling ducts.

BACKGROUND OF THE INVENTION

Extended flute milling cutters are well known in the industry. They enable using one or more sets of cutting inserts, each set comprising several consecutive cutting inserts arranged at the periphery of the cutter, axially overlapping each other, in order to form a long peripheral effective cutting edge for milling, for example, a deep shoulder whose depth is larger than the length of a side cutting edge of a single cutting insert. In the circumferential direction of the milling cutter, each cutting insert is considered to belong to a circumferential row ("row"), each row typically having at least as many cutting inserts as the number of sets.

As a result of a growing demand for high productivity cutting tools, many extended flute milling cutters available in the market are provided with internal cooling ducts in order to supply cooling medium to the cutting inserts. Some milling cutters are provided with coolant holes adjacent each of the cutting inserts mounted therein in order to effectively supply cooling medium to the active cutting edge of each of the cutting inserts.

In some applications, for example, when milling a shallow shoulder whose depth is less then the length of the extended flute milling cutter, not all the rows of the cutting inserts are used. For example, if the milling cutter is provided with five rows of cutting inserts, it may be that only the first two axially forwardmost rows are active whilst the three axially rearwardmost rows are not active, i.e., do not participate in the cutting process. In such a case, the axially rearwardmost rows of cutting inserts are unnecessarily cooled. As a result, the coolant volumetric flow rate is ineffectively used since it could have been directed in its entirety to the active rows only. This leads, of course, to unnecessary operation costs which could be saved.

A solution to this deficiency, as suggested by several tools manufacturers, is producing the cooling holes with threads. Thus, if it is required to avoid using several rows of cutting inserts, the respective cooling holes are plugged with screws that are threadingly engaged with the threads of the cooling holes.

Even though the outcome of such a solution is cooling only the active rows of cutting inserts, this solution may not be practical since it may require threadingly engaging or disengaging a large number of very small screws each time a change of the cutting depth is required, a task that is substantially time consuming.

SUMMARY OF THE INVENTION

In one aspect, the present invention is directed to a cutting tool comprising a tool body having a body central bore, a center pin seated within the body central bore, and a relocatable seal seated on the center pin; wherein:
when the relocatable seal is seated at a first sealing position along the center pin, the body central bore is in fluid communication with a first number of rows of cutting inserts; and
when the relocatable seal is seated at a second sealing position along the center pin, the body central bore is in fluid communication with a second number of rows of cutting inserts that is different from the first number of rows of cutting inserts.

In another aspect, the present invention is directed to a cutting tool having a longitudinal axis of rotation and comprising:
a tool body comprising:
a body front face;
a body rear face, opposite the body front face;
a body peripheral face, extending rearwardly from the body front face;
a body central bore extending in a forward to rear direction of the tool body;
at least one flute formed on the body peripheral face and extending rearwardly from the body front face, the at least one flute comprising a first row of insert pockets adjacent the body front face and at least a second row of insert pockets axially rearwardly displaced with respect to the first row, wherein each of the insert pockets is associated with a cooling hole that is in fluid communication with the body central bore;
a cutting insert retained within each of the insert pockets, the cutting inserts retained in the first row of insert pockets forming a first row of cutting inserts, and the cutting inserts retained in the second row of insert pockets forming a second row of cutting inserts;
a center pin having a pin axis and seated within the body central bore, the center pin comprising a center pin bore longitudinally extending along the pin axis; and
a relocatable seal bounded between the center pin and the body central bore;
wherein:
the center pin has a center grooved portion comprising at least two pin grooves (86) axially spaced from each other; and
the relocatable seal is adjustable between:
a first sealing position in which the relocatable seal is seated in a first of said at least two pin grooves and the body central bore is in fluid communication with cooling holes associated with a first number of rows of cutting inserts; and
a second sealing position in which the relocatable seal is seated in a second of said at least two pin grooves and the body central bore is in fluid communication with cooling holes associated with a second number of rows of cutting inserts, the second number of rows of cutting inserts being different from the first number of rows of cutting inserts.

Practically, the relocatable seal is an o-ring.

In some embodiments, the center pin bore extends rearwardly to a rear end of the center pin.

Advantageously, the center grooved portion of the center pin comprises at least one pin cooling outlet that is in fluid communication with the center pin bore.

If desired, a forward end of the center pin bore is plugged with a plug.

In some embodiments, a rear portion of the center pin comprises a rear threaded portion.

Typically, a front portion of the center pin comprises a bolt head.

In some embodiments, the center pin comprises a pin axial abutment surface rearward to the center grooved portion.

If desired, the cutting tool comprises an auxiliary seal seated within a secondary seal groove in a bore forward facing face of the body central bore.

In yet another aspect, the present invention is directed to a method for adjusting the cooling mechanism in an extended flute milling cutter, the method comprising the steps of:

(a) providing the aforementioned cutting tool in the form of an extended flute milling cutter;

(b) dismantling the center pin from the milling cutter;

(c) moving the relocatable seal from the first sealing position to the second sealing position to enable the body central bore to be in fluid communication with cooling holes associated with a second number of rows of cutting inserts that is different from the first number of rows of cutting inserts; and (d) reassembling the center pin into the milling cutter.

In still another aspect, the present invention is directed to a method for adjusting the cooling mechanism in an extended flute milling cutter having a body central bore connected to a plurality of rows of cutting inserts mounted on the cutter, and a center pin seated within the body central bore, the center pin having seated thereon a relocatable seal whose position along the center pin can be varied, the method comprising the step of:

(a) varying the position of the relocatable seal along the center pin from a first sealing position to a second sealing position to thereby change the number of rows of cutting inserts that are in fluid communication with the body central bore.

The method for adjusting the cooling mechanism may further comprise dismantling the center pin from the milling cutter, prior to varying the position of the relocatable seal.

In still another aspect, the present invention is directed to a method for controlling the number of rows of cutting inserts that are supplied with cooling fluid, the rows of cutting inserts being located on an extended flute milling cutter which comprises a tool body having a body central bore, the method comprising:

(a) providing a center pin bearing a relocatable seal whose position along a length of the center pin determines the number of rows of cutting inserts receiving cooling fluid, upon seating of the center pin in the body central bore;

(b) seating said center pin in the body central bore; and (c) supplying cooling fluid to one or more rows of cutting inserts via the body central bore.

BRIEF DESCRIPTION OF THE DRAWINGS

For a better understanding the invention will now be described, by way of example only, with reference to the accompanying drawings in which.

DETAILED DESCRIPTION OF THE INVENTION

Figure 1:
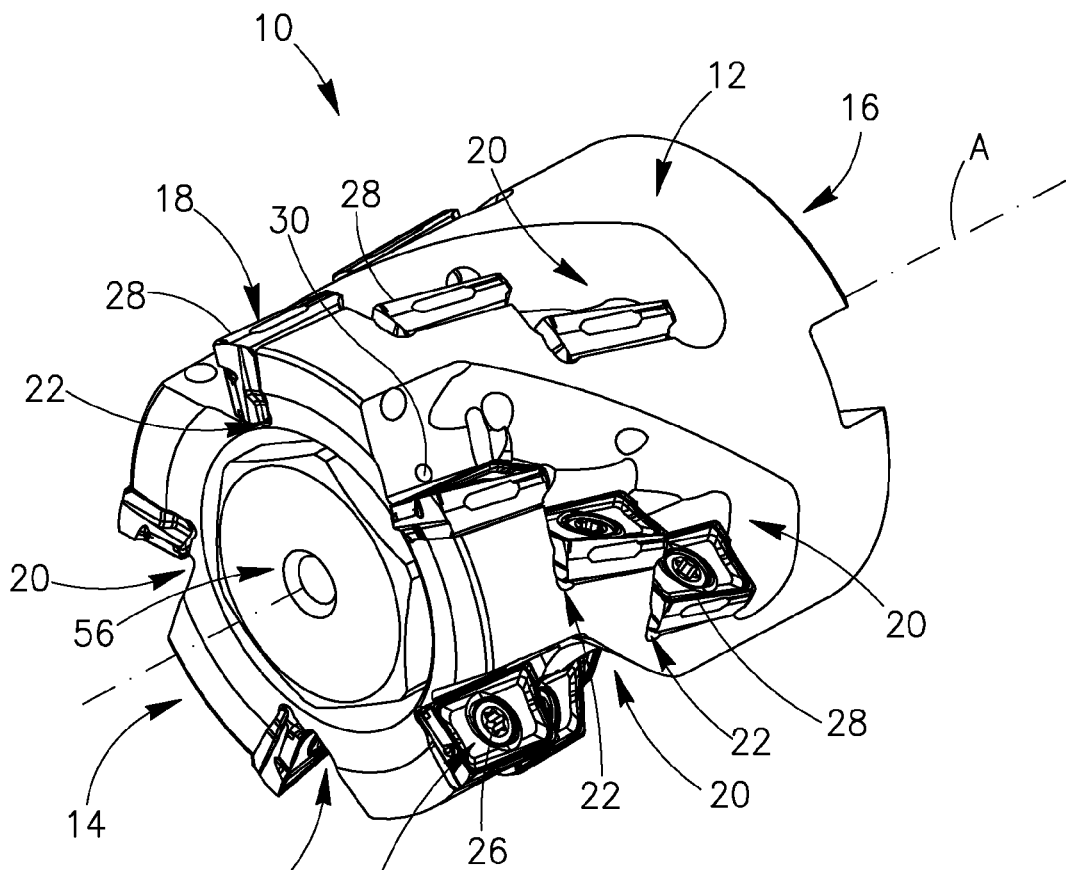
FIG. 1 is a perspective view of a cutting tool in accordance with the present invention.
Figure 2:
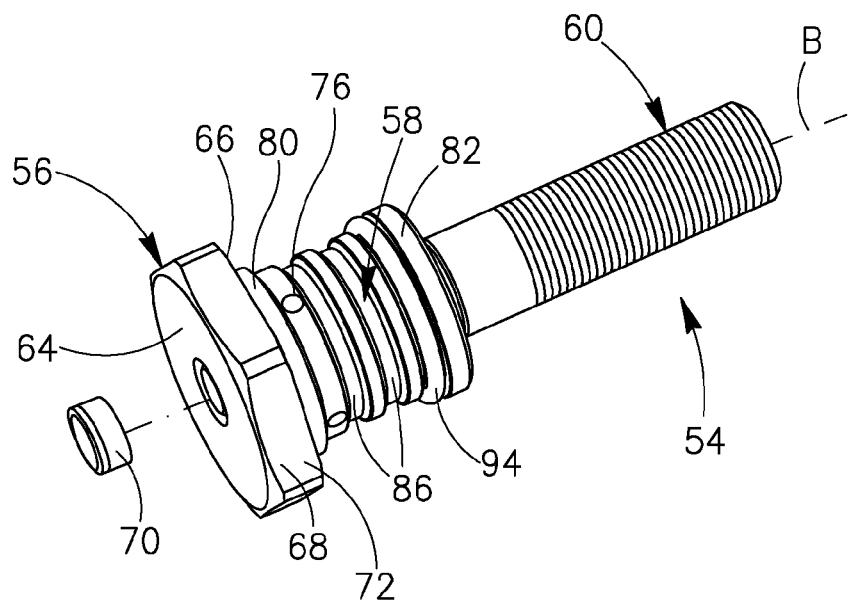
FIG. 2 is a perspective view of a center pin with a relocatable seal mounted thereon.
Figure 3:
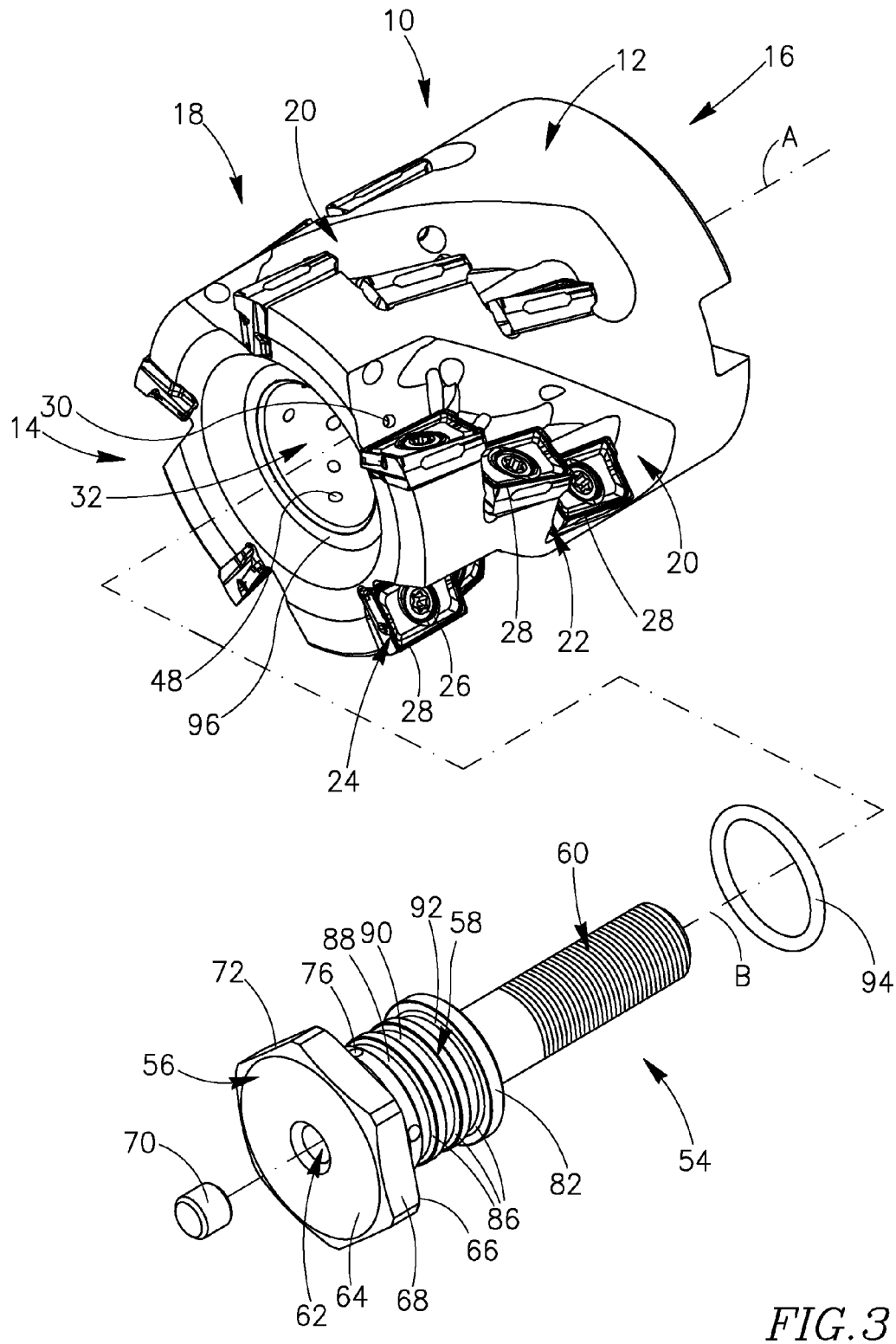
FIG. 3 is an exploded view of the cutting tool.
Figure 4:
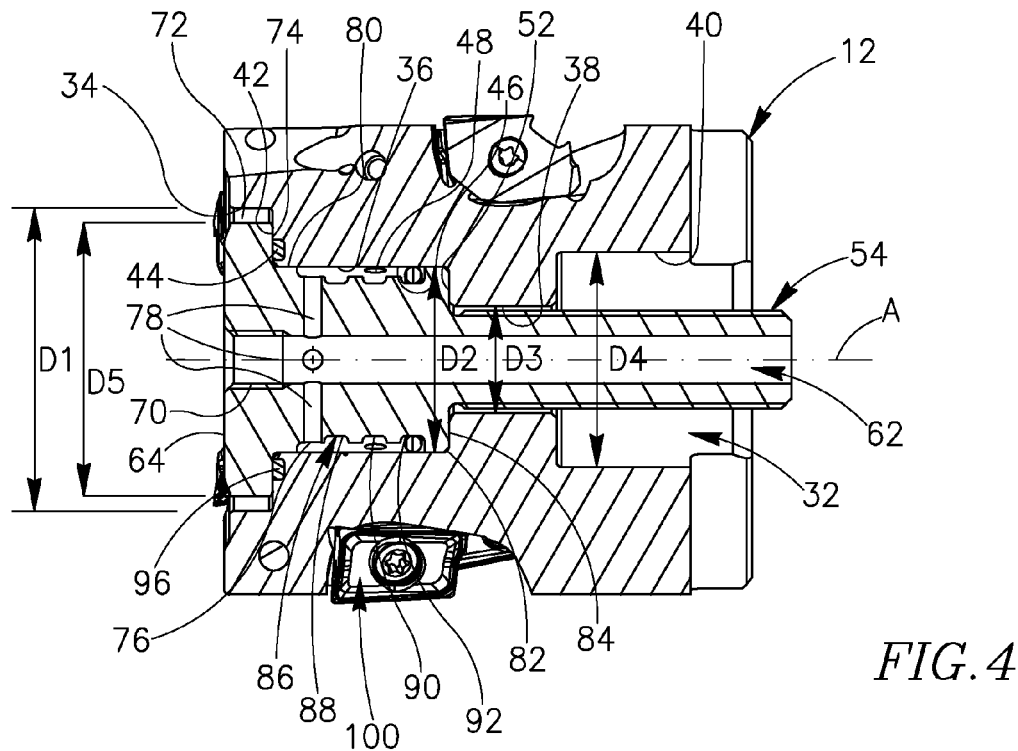
FIG. 4 is a side cross-section of the cutting tool.

Attention is drawn to FIGS. 1 to 7, showing a cutting tool 10 in accordance with the present invention. The cutting tool 10 has an axis of rotation A, defining a forward to rearward direction, and comprises a tool body 12 having a body front face 14, generally perpendicular to the axis of rotation A, a body rear face 16, opposite the body front face 14, and a body peripheral face 18 extending from the body front face 14 to the body rear face 16.

The tool body 12 is provided with a plurality of flutes 20 formed on the body peripheral face 18 and extending rearwardly from the body front face 14. The cutting tool 10 shown in the drawings is provided with five flutes 20. It should be understood, however, that the cutting tool 10 according to the present invention is not limited to having five flutes 20 and any number of flutes 20 may be equally applicable, for example, one, two, three and so on.

Each flute 20 comprises a plurality of insert pockets 22 that are axially displaced with respect to each other. It should be noted that the present invention is particularly applicable for flutes 20 having at least two insert pockets 22, but flutes 20 having higher number of insert pockets 22 are similarly applicable.

A cutting insert 24 is retained in each of the insert pockets 22 by means of a retaining screw 26. Cutting tools of the type shown in the figures are often referred to in the art as an extended flute milling cutter since, as mentioned hereinabove, the cutting inserts are arranged such that they axially overlap each other in order to form a long peripheral effective cutting edge with an associated axially extending flute. The construction of the insert pockets and the way of forming the long peripheral effective cutting edge are not essential features of the present invention and therefore will not be further described. Generally speaking, however, the cutting inserts in a given flute can be considered to form a "set" of cutting inserts.

Figure 5:
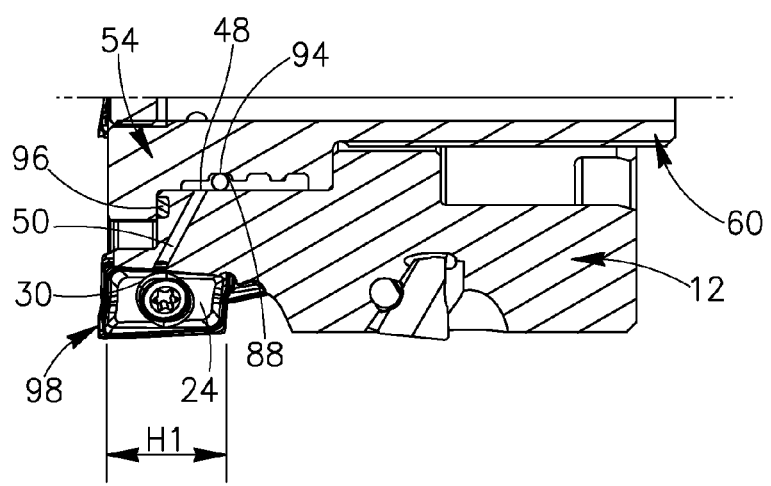
FIG. 5 is a cross-section of the cutting tool taken in a first position of the relocatable seal.
Figure 6:
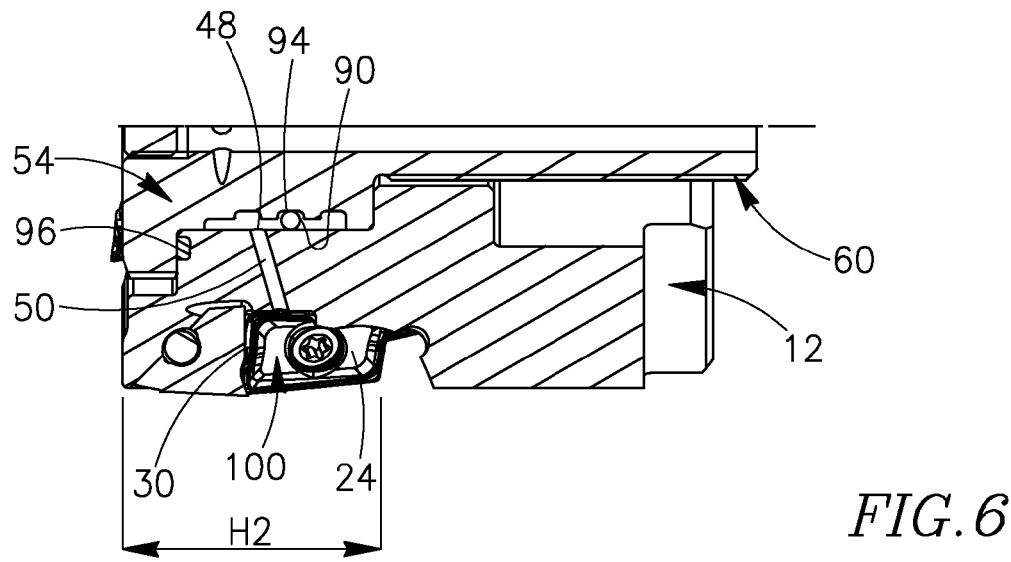
FIG. 6 is a cross-section of the cutting tool taken in a second position of the relocatable seal.
Figure 7:
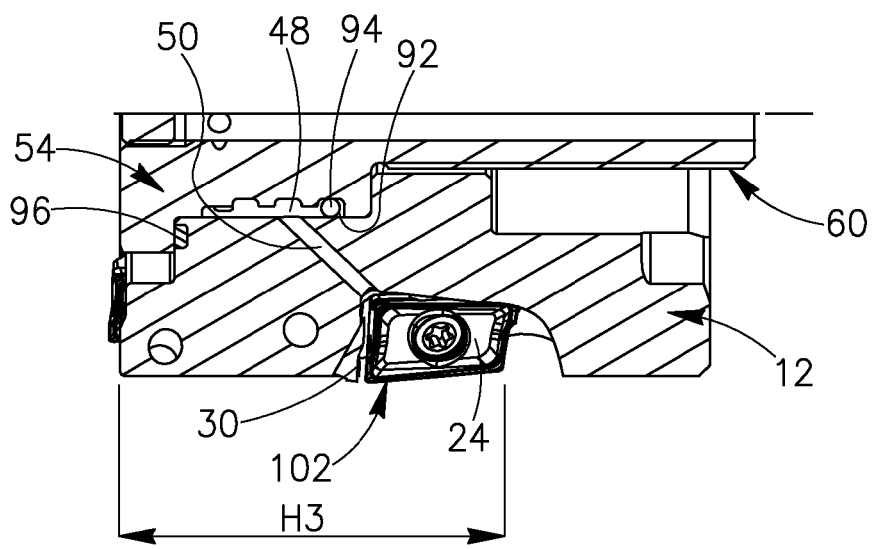
FIG. 7 is a cross-section of the cutting tool taken in a third position of the relocatable seal.

A peripheral cutting edge of each of the cutting inserts 24 constitutes an active peripheral cutting edge 28 if it participates in a machining process. A cooling hole 30 is associated with each of the cutting inserts 24 in order to supply a coolant fluid directly to each of the active peripheral cutting edges 28. Each cooling hole 30 is in fluid communication with a body central bore 32, as best seen in FIGS. 5, 6 and 7. According to a specific embodiment, as shown in the figures, the body central bore 32 extends from the body front face 14 to the body rear face 16 and comprises first 34, second 36, third 38 and fourth 40 bore portions having, respectively, first D1, second D2, third D3, and fourth D4, diameters.

The first bore portion 34, constituting a front bore portion, extends rearwardly from the body front face 14. A rear portion of the first bore portion 34 constitutes a bore forward facing face 42 that is substantially perpendicular to the axis of rotation A. The bore forward facing face 42 comprises a ring shaped secondary seal groove 44 that extends around the axis of rotation A.

The second bore portion 36, constituting a central bore portion having a central bore portion wall 46, extends rearwardly from the first bore portion 34. The second diameter D2 of the second bore portion 36 is smaller than the first diameter D1 of the first bore portion 34. The second bore portion 36 is provided with internal coolant holes 48 that are in fluid communication with the cooling holes 30 through cooling ducts 50. Typically, for the ease of manufacture, the cooling ducts 50 extend in a straight line from the cooling hole 30 to its corresponding internal coolant hole 48. A rear end of the second bore portion 36 constitutes a forwardly facing bore axial abutment surface 52. In one embodiment, the bore axial abutment surface 52 may be perpendicular to the axis of rotation A. However, in other embodiments, the bore axial abutment surface may be slanted with respect to the axis of rotation A.

The third bore portion 38, constituting an intermediate bore portion, extends rearwardly from the second bore portion 36.

The third diameter D3 of the third bore portion 38 is smaller than the second diameter D2 of the second bore portion 36.

The fourth bore portion 40, constituting a rear bore portion, extends rearwardly from the third bore portion 38. The fourth diameter D4 of the fourth bore portion 40 is larger than the third diameter D3 of the third bore portion 38.

A center pin 54 is seated within the body central bore 32. The center pin 54 is generally symmetrical with respect to a pin axis B and comprises a front cap portion 56, a center grooved portion 58 extending rearwardly from the front cap portion 56, and, a rear threaded portion 60 extending rearwardly from the center grooved portion 58. A center pin bore 62 extends through the center pin 54 along an entire length thereof.

The front cap portion 56 has a fifth diameter D5, constituting a cap diameter. The fifth diameter D5 is larger than the second diameter D2 and smaller than the first diameter D1. The front cap portion 56 has a front cap surface 64, an opposing rear cap surface 66, and a peripheral cap surface 68 therebetween.

The center pin bore 62 opens to the front cap surface 64 and may be plugged by a plug 70. The plug 70 may be fixed to the center pin bore 62 by, for example, one of the following methods; threadingly engaging therewith, glued thereto or brazed thereto, or by a combination thereof. The peripheral cap surface 68 may be formed as a bolt head 72 in order to enable holding and threadingly engaging the center pin 54 into a machine spindle (not shown in the figures). The rear cap surface 66 comprises a pin rearward facing face 74.

A front portion of the center grooved portion 58 is provided with a plurality of pin cooling outlets 76 that are in fluid communication with the center pin bore 62 through pin cooling ducts 78. Typically, the pin cooling ducts 78 are evenly distributed around the center pin bore 62 in order to provide adequate coolant flow through the center pin bore 62 and into the second bore portion 36 of the body central bore 32.

A front end of the center grooved portion 58 is provided with a front pin shoulder 80 having a diameter similar to the second diameter D2 and slightly smaller therefrom. A rear portion of the center grooved portion 58 is provided with a rear pin shoulder 82 having a diameter similar to the second diameter D2 and slightly smaller therefrom. The front pin shoulder 80 and the rear pin shoulder 82 enable the alignment of the pin axis B with the axis of rotation A and prevent radial or angular displacement of the center pin 54 with respect to the body central bore 32. A rear end of the rear pin shoulder 82 comprises a pin axial abutment surface 84.

The center grooved portion 58 is provided with a plurality of pin grooves 86 that are axially displaced from each other. The pin grooves 86 generally extend in a circumferential direction about the center grooved portion 58. In some embodiments, there are at least as many pin grooves 86 as there are rows of cutting inserts, if not the same number. In the embodiment shown, the center grooved portion 58 is provided with three grooves, namely, a first pin groove 88 adjacent the pin cooling outlets 76, a second pin groove 90 rearward to the first pin groove 88, and, a third pin groove 92 rearward to the second pin groove 90 and adjacent the rear pin shoulder 82.

A resilient relocatable seal 94 in the form of an o-ring is placed into one of the pin grooves 86. In an unpressed position of the relocatable seal 94, namely, when it is mounted within a given pin groove 86 and the center pin 54 not yet inserted into the body central bore 32, the outer diameter of the relocatable seal 94 is slightly larger than the second diameter D2 of the second bore portion 36. The cross-section of the relocatable seal 94 may be round, quadrilateral, or of any other suitable shape.

When assembling the cutting tool 10 onto a spindle of a machine, a protruding portion of the spindle (not shown) enters into the rear bore portion 40 of the tool body 12. Then, the center pin 54 is inserted through the body front face 14, rotated by the bolt head 72, and threadingly engaging into the spindle.

In this position, the pin axial abutment surface 84 firmly abuts against the bore axial abutment surface 52, thus, the center pin 54 is firmly held in a desired position. Furthermore, leakage of coolant through a rear portion of the second bore portion 36 may be prevented, regardless of the presence of the relocatable seal 94. At the first bore portion 34, the pin rearward facing face 74 may be positioned adjacent the bore forward facing face 42, thus forming a very small gap therebetween and reducing to a minimum any leakage of coolant through the body front face 14. However, in a case when it is desired to absolutely prevent any leakage of coolant through the first bore portion, an auxiliary seal 96 in the form of an o-ring may be inserted within the secondary seal groove 44. In such case, the pin rearward facing face 74 presses against the auxiliary seal 96, and leakage of coolant between the pin rearward facing face 74 and the bore forward facing face 42 is prevented.

The method of adjusting the cooling mechanism of the extended flute milling cutter 10 will now be described. In the embodiment of the milling cutter 10 shown in the figures, it is provided with five flutes 20. In the specific application shown in the figures, each flute 20 comprises three cutting inserts 24 that are axially displaced with respect to each other to form a long peripheral effective cutting edge 28. For sake of clarity, the cutting inserts 24 that are mounted adjacent the body front face 14 will be referred to as a first row 98 of cutting inserts. The cutting inserts 24 that are mounted axially rearwardly to the first row 98 will be referred to as a second row 100 of cutting inserts. The cutting inserts 24 that are mounted axially rearwardly to the second row 100 will be referred to as a third row 102 of cutting inserts.

The cutting tool 10 may be used to cut a relatively shallow shoulder with only the first row 98 of cutting inserts being active. In such case, a first depth H1 may be cut by the first row 98. For a deeper depth of cut, the second row 100 of cutting inserts may be used as well to cut a second depth H2. For cutting the deepest cut possible by the cutting tool 10, the third row 102 of cutting inserts is also used and a third depth H3 may be cut.

When only the first row 98 of cutting inserts is used, it may be desired to supply coolant only to the first row 98. In such case, the relocatable seal 94 is placed on the first pin groove 88 as shown in FIG. 5. In this position, the relocatable seal 94 is positively pressed between the first pin groove 88 and the central bore portion wall 46, thus avoiding the passage of any coolant therethrough. Thus, the coolant flow will pass through the center pin bore 62 and through the pin cooling ducts 78 into the second bore portion 36. By eliminating any other passage of the coolant, it will be forced to enter the internal coolant holes 48 of the first row 98 only, flow through the cooling ducts 50 of the cutting inserts of the first row 98, and emerge through the cooling holes 30 corresponding to the first row 98 of cutting insert. In this manner, the coolant flow is effectively guided to the active cutting inserts only and unnecessary cooling of the inactive cutting inserts is successfully avoided, leading to a saving of coolant fluid, and, consequently, reducing production costs.

When only the first row 98 and the second row 100 of cutting inserts are to be used, the changing of the cooling mechanism of the cutting tool 10 becomes very easy and practical. The center pin 54 is unscrewed from the spindle and removed from the body central bore 32. In the next step, the relocatable seal 94 is moved from the first pin groove 88 to the second pin groove 90 and the center pin 54 is reassembled into the tool body 12 in the same manner as described above. This position is shown in FIG. 6. Now, in a similar manner as explained with respect to FIG. 5, the coolant is forced to flow only to the first row 98 and the second row 100 of cutting inserts, and unnecessary cooling of the third row 102 is successfully avoided.

When all the rows of cutting inserts are to be used, the relocatable seal 94 is moved to the third pin groove 92 to the position shown in FIG. 7, in the same manner as explained above.

According to the explanation above, it can be understood by a person skilled in the art that the present invention provides an efficient and simple to use method of adjusting the cooling mechanism of an extended flute milling cutter, with the disadvantages of prior art methods being successfully overcome.

Although the present invention has been described to a certain degree of particularity, it should be understood that various alterations and modifications can be made without departing from the spirit or scope of the invention as hereinafter claimed.

For example, the body central bore 32 does not have to be provided with a front bore portion 34 that is wider than the central bore portion and other shapes of the body central bore 32 may be used.

The center pin bore 62 does not have to extend to the rear end of the center pin 54. In which case, the cooling medium may be supplied to the center pin bore 62 through a radially directed connection instead of being axially connected through the rear end of the center pin 54.

The center pin bore 62 does not have to extend along the entire length of the center pin 54 and it may extend only along a portion of the center pin 54. In which case, when the center pin bore 62 is produced as a blind hole without opening to the front cap surface 64, the use of a plug 70 may be avoided.

The cooling ducts 50 do not have to extend in a straight line from an internal coolant hole 48 to its corresponding cooling hole 30. Thus, for example, the cooling ducts 50 may be formed from two separate segments, directed at different directions, that merge together, when a first segment extends from a cooling hole 30 into the tool body 10, and, a second segment extends from an internal coolant hole 48 into the tool body 10 and merges with the first segment.

The cutting tool 10 shown in the drawings and explained in detail is not limited to cut a shoulder and other milling operations may be equally applicable, for example, side milling, slot milling, etc.

What is claimed is:

1. A cutting tool (10) having an axis (A) defining a forward to rearward direction, the cutting tool comprising a fluted tool body (12) having a body front face (14) at a forward end of the cutting tool and a plurality of cutting inserts (24), each cutting insert retained by a retaining screw (26) and belonging to one of a plurality of circumferential rows, the tool body (10) also having a body central bore (32), a center pin (54) seated within the body central bore (32), and a relocatable seal (94) seated on the center pin (54); wherein:
when the relocatable seal (94) is seated at a first sealing position along the center pin (54), the body central bore (32) is in fluid communication with a first number of axially forwardmost rows of cutting inserts;
when the relocatable seal (94) is seated at a second sealing position along the center pin (54), the body central bore (32) is in fluid communication with a second number of axially forwardmost rows of cutting inserts that is different from the first number of rows of cutting inserts; and
in at least one of the first and second sealing positions, the body central bore (32) is not in fluid communication with one or more axially rearwardmost rows of cutting inserts.

2. A cutting tool (10) having a longitudinal axis of rotation (A) and comprising:
a tool body (12) comprising:
a body front face (14);
a body rear face (16), opposite the body front face (14);
a body peripheral face (18), extending rearwardly from the body front face (14);
a body central bore (32) extending in a forward to rear direction of the tool body (12); and
at least one flute (20) formed on the body peripheral face (18) and extending rearwardly from the body front face (14), the at least one flute comprising a first row of insert pockets adjacent the body front face (14) and at least a second row of insert pockets axially rearwardly displaced with respect to the first row, wherein each of the insert pockets (22) is associated with a cooling hole (30) that is in fluid communication with the body central bore (32);
a cutting insert (24) retained within each of the insert pockets (22), the cutting inserts (24) retained in the first row of insert pockets forming a first row (98) of cutting inserts, and the cutting inserts (24) retained in the second row of insert pockets forming a second row (100) of cutting inserts;
a center pin (54) having a pin axis (B) and seated within the body central bore (32), the center pin comprising a center pin bore (62) longitudinally extending along the pin axis (B); and
a relocatable seal (94) bounded between the center pin (54) and the body central bore (32);
wherein:
the center pin (54) has a center grooved portion (58) comprising at least two pin grooves (86) axially spaced from each other; and
the relocatable seal (94) is adjustable between:
a first sealing position in which the relocatable seal is seated in a first of said at least two pin grooves and the body central bore (32) is in fluid communication with cooling holes (30) associated with a first number of rows of cutting inserts; and
a second sealing position in which the relocatable seal is seated in a second of said at least two pin grooves and the body central bore (32) is in fluid communication with cooling holes (30) associated with a second number of rows of cutting inserts, the second number of rows of cutting inserts being different from the first number of rows of cutting inserts.

3. The cutting tool (10) according to claim 2, wherein:
the relocatable seal (94) is an o-ring.

4. The cutting tool (10) according to claim 2, wherein:
the center pin bore (62) extends rearwardly to a rear end of the center pin (54).

5. The cutting tool (10) according to claim 2, wherein:
the center grooved portion (58) of the center pin (54) comprises at least one pin cooling outlet (76) that is in fluid communication with the center pin bore (62).

6. The cutting tool (10) according to claim 2, wherein:
a forward end of the center pin bore (62) is plugged with a plug (70).

7. The cutting tool (10) according to claim 2, wherein:
a rear portion of the center pin (54) comprises a rear threaded portion (60).

8. The cutting tool (10) according to claim 2, wherein:
a front portion of the center pin (54) comprises a bolt head (72).

9. The cutting tool (10) according to claim 2, wherein:
the center pin (54) comprises a pin axial abutment surface (84) rearward to the center grooved portion (58).

10. The cutting tool (10) according to claim 2, further comprising an auxiliary seal (96) seated within a secondary seal groove (44) in a bore forward facing face (42) of the body central bore (32).

11. A method for adjusting the cooling mechanism in an extended flute milling cutter (10), the method comprising the steps of:
(a) providing an extended flute milling cutter (10) in accordance with the cutting tool of claim 2;
(b) dismantling the center pin (54) from the milling cutter (10);
(c) moving the relocatable seal (94) from the first sealing position to the second sealing position to enable the body central bore (32) be in fluid communication with cooling holes (30) associated with a second number of rows of cutting inserts that is different from the first number of rows of cutting inserts; and
(d) reassembling the center pin (54) into the milling cutter (10).

12. A method for adjusting the cooling mechanism in an extended flute milling cutter (10) having a body central bore (32) connected to a plurality of rows of cutting inserts mounted on the cutter, and a center pin seated within the body central bore, the center pin (54) having seated thereon a relocatable seal (94) whose position along the center pin can be varied, the method comprising the step of:
varying the position of the relocatable seal (94) along the center pin (54) from a first sealing position to a second sealing position to thereby change the number of rows of cutting inserts that are in fluid communication with the body central bore (32).

13. The method according to claim 12, further comprising:
dismantling the center pin (54) from the milling cutter (10) before varying the position of the relocatable seal (94).

14. In an extended flute milling cutter (10) having an axis (A) defining a forward to rearward direction, the milling cutter comprising a tool body (12) having a body front face (14) at a forward end of the milling cutter and a plurality of cutting inserts (24), each cutting insert belonging to one of a plurality of circumferential rows, the tool body (12) also having a body central bore (32), a method for supplying one or more axially forwardmost rows of cutting inserts with cooling fluid, the method comprising:
(a) providing a center pin (54) bearing a relocatable seal (94) whose position along a length of the center pin (54) determines the number of axially forwardmost rows of cutting inserts receiving cooling fluid, upon seating of the center pin (54) in the body central bore (32); and
(b) seating said center pin (54) in the body central bore (32); and
(c) supplying cooling fluid to one or more axially forwardmost rows of cutting inserts via the body central bore (32), without supplying cooling fluid to one or more axially rearwardmost rows of cutting inserts.

15. A cutting tool (10) having an axis (A) defining a forward to rearward direction, the cutting tool comprising a tool body (12) having a body front face (14) at a forward end of the cutting tool, a body peripheral face (18), a body central bore (32), a center pin (54) seated within the body central bore (32), and a relocatable seal (94) seated on the center pin (54); wherein:
when the relocatable seal (94) is seated at a first sealing position along the center pin (54), the body central bore (32) is in fluid communication with a first non-zero number of axially forwardmost rows of cutting inserts (24) on the body peripheral face (18); and
when the relocatable seal (94) is seated at a second sealing position along the center pin (54), the body central bore (32) is in fluid communication with a second non-zero number of axially forwardmost rows of cutting inserts on the body peripheral face (18), the second number being different from the first number; and
in at least one of the first and second sealing positions, the body central bore (32) is not in fluid communication with one or more axially rearwardmost rows of cutting inserts.

16. The cutting tool (10) according to claim 15, wherein:
the center pin (54) has a center grooved portion (58) provided with a plurality of pin grooves (86) that are axially displaced from each other; and
the relocatable seal (94) is seated in one of the plurality of pin grooves (86).

* * * * *